United States Patent [19]
Torok

[11] 3,861,784
[45] Jan. 21, 1975

[54] PROGRAMMABLE DIFFRACTION GRATING

[75] Inventor: Ernest J. Torok, St. Paul, Minn.

[73] Assignee: Sperry Rand Corporation, New York, N.Y.

[22] Filed: June 29, 1973

[21] Appl. No.: 375,255

[52] U.S. Cl. .............................. 350/162 R, 350/161
[51] Int. Cl. .............................................. G02b 5/18
[58] Field of Search ................ 350/151, 162 R, 161

[56] References Cited
UNITED STATES PATENTS
3,752,563  8/1973  Torok et al. ........................ 350/151

Primary Examiner—Ronald J. Stern
Assistant Examiner—Paul K. Godwin
Attorney, Agent, or Firm—Kenneth T. Grace; Thomas J. Nikolai; Marshall M. Truex

[57] ABSTRACT

An electrically alterable apparatus and method of operation thereof that permits the optical processing of an image is disclosed. The apparatus includes an array of optical cells comprised of a plurality of XY stripline arrays and a stripedomain film element. The stripe-domain wall separation and wall orientation at each point in the film element are selectively controllable for generating in the optical cell array an electrically alterable hologram. Domain wall configurations to perform various optical processing tasks are disclosed.

11 Claims, 13 Drawing Figures

3,861,784

GRATING TO REMOVE LINEAR DISTORTION

GRATING TO REMOVE U SHAPED DISTORTION

FRESNEL ZONE PLATE;
GRATING TO PERFORM THE FUNCTION OF A LENS

GRATING TO PERFORM SIMULTANEOUSLY THE FUNCTION
OF A LENS AND TRANSLATION OF THE IMAGE

GRATING THAT ROTATES THE IMAGE

GRATING FOR SIMULTANEOUS
ROTATION AND TRANSLATION OF IMAGE

PROGRAMMABLE DIFFRACTION GRATING

BACKGROUND OF THE INVENTION

In prior art, image processing of, e.g., aerial photographs as by Fourier transform techniques using digital computers is well known. However, because of the need for sophisticated processing of such images the necessary operations to perform such processing approaches unreasonable computer times. Accordingly, it is desirable that such serial photographs be processed in real-time using minimum computer operations. See the article "The Ultimate Computer," IEEE Spectrum, March 1972, pages 84 - 91. The present invention utilizes holographic techniques to process such images in a real-time optical processing system.

SUMMARY OF THE INVENTION

In the copending patent application of E. J. Torok, et al., Ser. No. 177,081, filed Sept. 1, 1971, now U.S. Pat. No. 3,752,563, incorporated herein by reference, there is disclosed a light deflector system that utilizes inter-domain walls, i.e., the domain walls between adjacent stripe domains, in a magnetic film as a diffraction grating. Means are provided to vary the separation of adjacent domain walls and the rotatable orientation of the parallel stripe-domains. The resulting system is utilized to control, by the Kerr or Faraday effect, the focus of a light beam that is directed upon the plane of the film. The present invention is considered to be an improvement invention over the above referenced patent application and may be broadly considered, in the apparatus disclosed, to be a plurality of stripline arrays configured to permit the individual and selective control of the separation and the orientation of the domain walls in each portion of the film. This selective control of the domain wall separation and orientation in each part of the film permits an arbitrary configuration of domain walls of substantially continuously varying spacing and direction. Domain wall arrangements of different fixed configurations to perform various image processing functions are illustrated.

DESCRIPTION OF THE PREFERRED EMBODIMENT

Figure 1:
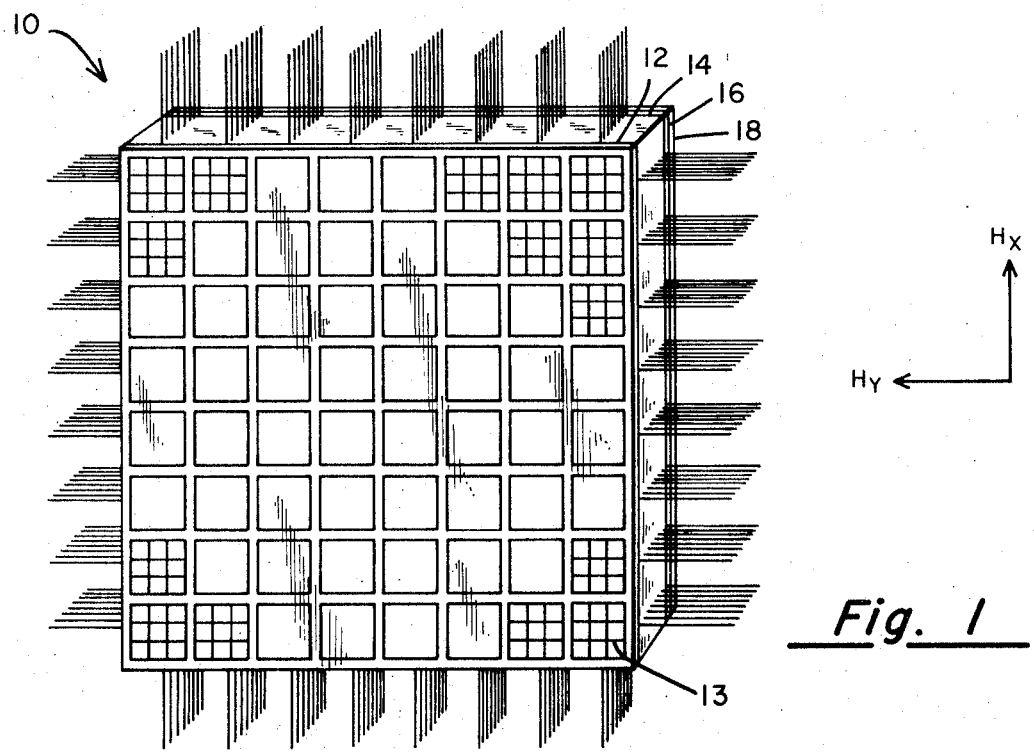
FIG. 1 is a perspective view of the programmable diffraction grating of the present invention.

With particular reference to FIG. 1 there is presented a perspective view of the electrically alterable diffraction grating 10 incoparating the present invention. Grating 10 is comprised of the following component parts, listed from the near planar surface:

a. A planar matrix array 12 of X and Y directioned-magnetic-field-generating X and Y elements, respectively, each of which elements consists of a set of parallel striplines 13; the X element striplines are oriented superposed and orthogonal to the Y element striplines such that currents coupled to the X and Y elements generate orthogonal X and Y directioned magnetic fields all in the plane of the grating 10. Such elements may be formed by well known chemical etching methods from a double copper clad dielectric substrate.

b. An interconnection matrix 14 formed of a multilayer printed circuit board construction for coupling each X and Y selection line to the one associated X and Y element of the matrix array of X and Y elements.

c. An optical mirror 16 deposited on the side of the film 18 nearest the striplines.

d. A stripe-domain film layer 18 of, e.g., YIG crystal such as discussed in the aforementioned E. J. Torok, et al., patent application. Film layer 18 is preferably a continuous layer throughout the planar dimensions of grating 10, individual portions of which are individually associated with superposed X and Y elements of array 12 to form, in effect, an optical cell in which the separation and orientation of the stripe-domains are varied by varying the intensity and direction of DC field in the plane of the film. Hysteresis in the film layer 18 is concurrently overcome by an AC tickle magnetic field that is directed perpendicular to the plane of the grating 10.

Figure 2:
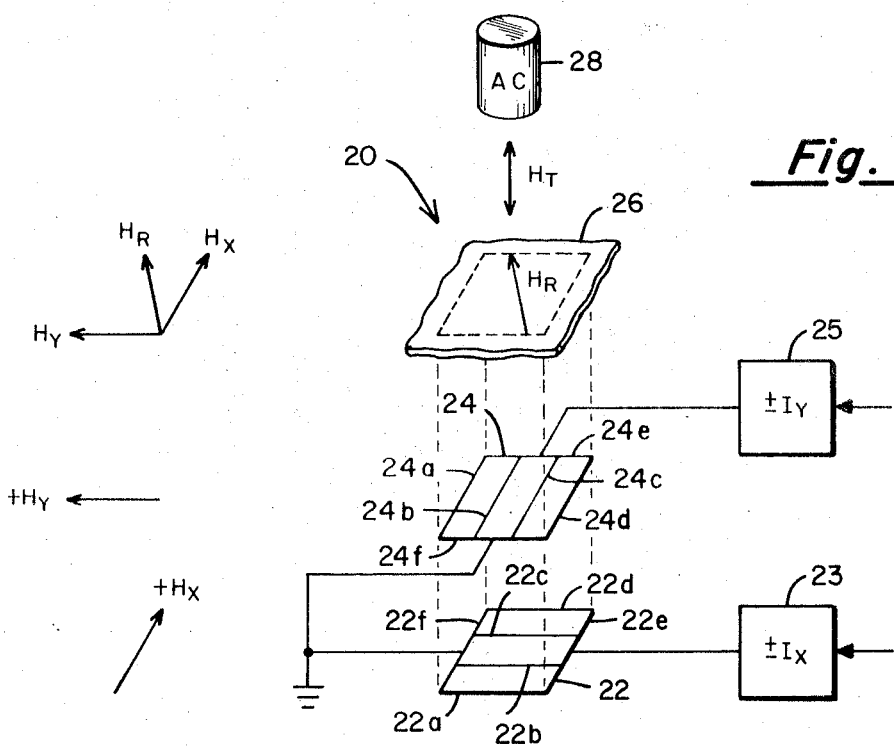
FIG. 2 is a diagrammatic illustration of a single optical cell of the XY matrix array of optical cells of the grating of FIG. 1.

With particular reference to FIG. 2 there is presented a diagrammatic view of a typical optical cell 20 formed by the single superposed X element 22, Y element 24 and film 26 which is that portion of film layer 18 of FIG. 1 that is particularly inductively coupled to the superposed associated X element 22 and Y element 24.

Also illustrated in FIG. 2 are current signal sources 23 and 25 which are the sources of the X and Y selection currents that are coupled to X element 22 and Y element 24 for generating the respectively associated X directioned field $H_X$ and Y directioned field $H_Y$. Fields $H_X$ and $H_Y$, being inductively coupled to film 26, generate, in the plane of film 26, the resultant field $H_R$ which is the vector resultant of the polarity and magnitude or the orthogonal vector fields $H_X$ and $H_Y$. Thus, by continuously varying the polarity and magnitude of the vector fields $H_X$ and $H_Y$ there can be generated in the plane of film 26 a DC resultant field $H_R$ of any desired direction and magnitude. X element 22 and Y element 24 are schematically illustrated as being comprised of four parallel lines, e.g., 22a, 22b, 22c, 22d parallel coupled by lines 22e, 22f. Also illustrated is the source 28 of the AC tickle field $H_T$ which is directed normal or perpendicular to the plane of film 26 for overcoming the hysteresis of film 26 during the application of the fields $H_X$ and $H_Y$.

Figure 3:
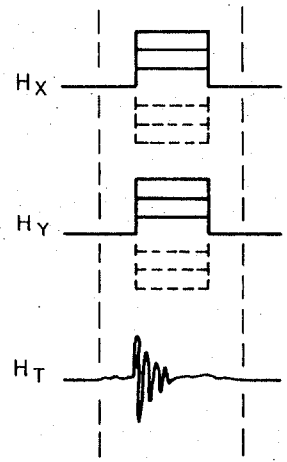
FIG. 3 is an illustration of typical drive field waveforms and the timing thereof utilized in the present invention.

With particular reference to FIG. 3 there is illustrated an idealized timing diagram of the concurrently applied DC orthogonal fields $H_X$ and $H_Y$ in the plane of film 26 and the AC field $H_T$ applied normal to the plane of film 26. As indicated, fields $H_X$ and $H_Y$, each of which may be any of various possible polarities and magnitudes, may be initiated and then terminated at substantially concurrent times to fix the domain walls in film 26 in the associated domain wall orientations until new fields $H_X$ and $H_Y$ are inductively coupled thereto while the AC tickle field $H_T$ of diminishing amplitude occurs only at the begining in time of fields $H_X$ and $H_Y$.

Figure 4:
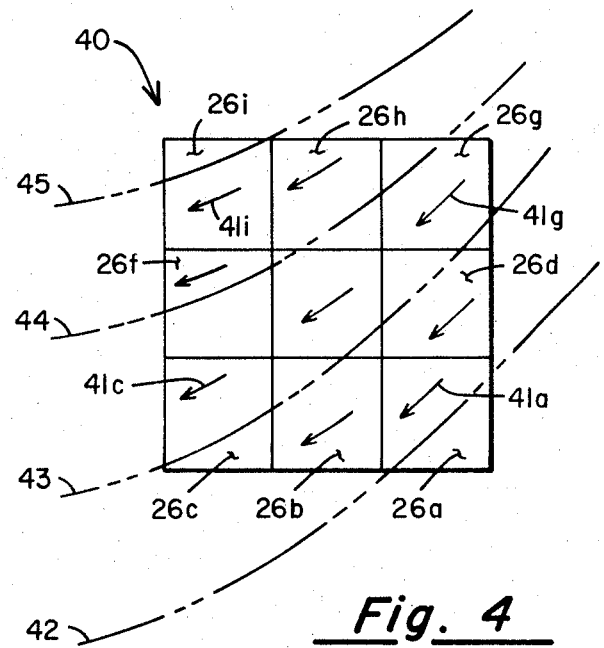
FIG. 4 is an illustration of an XY array of 9 optical cells of the grating of FIG. 1 with typical domain wall and magnetization vector orientations.

With particular reference to FIG. 4 there is presented a schematic illustration of a grating 40 formed of an XY array of film 26a – 26i in which have been formed the associated domain wall orientations schematically illustrated by the associated vectors 41a – 41i. Such vectors 41a – 41i in each of the respectively associated films 26a – 26i are illustrated as being oriented along the substantially continuous curvilinear lines of domain walls 42, 43, 44, 45 adjacent ones of which are separated by different dimensioned wall separations along their lengths.

Because of the size considerations, each film 26a – 26i is illustrated as having a single domain wall oriented along an associated continuous line 42 – 45 with the varying wall separation of each film 26a – 26i schematically illustrated by the varying separation between adjacent lines 42 – 45. Because the film 26 is continuous over the grating 10 and because the X and Y elements are separated from the film 26 by a finite distance, the resultant field $H_R$ in each of the films 26a – 26i is smoothed out over the plane of the film 26. Thus, the domain wall orientation in each of the films 26a – 26i is affected by that of the next adjacent film 26a – 26i to generate a configuration of substantially continuous curvilinear domain walls of varying wall separation, all as determined by the respective polarities and magnitudes of the selection currents $I_X$ and $I_Y$ as coupled to the respectively associated X and Y elements---see FIG. 2.

Figure 5:
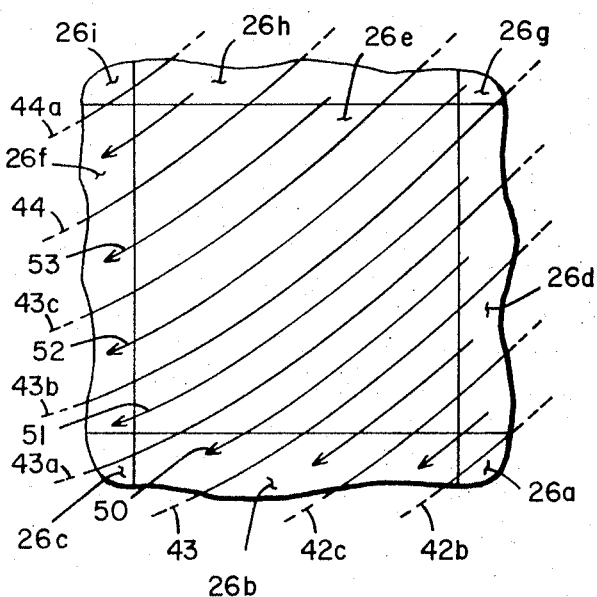
FIG. 5 is an illustration of a single film element of FIG. 4 illustrating in more detail the domain wall and magnetization orientations grossly illustrated in FIG. 4.

With particular reference to FIG. 5 there is presented a schematic illustration of an example of the domain walls that may exist between the domain walls 43, 44 of FIG. 4 as particularly relating to film 26a. In FIG. 5, film 26e is illustrated as having three domain walls 43a, b, c spaced between domain walls 43 and 44 with each domain between adjacent domain walls having its associated magnetization vector 50, 51, 52, 53. It is to be appreciated that film 26e, having the domain wall orientation 43, 45 of FIG. 4, could have more or less domain walls therebetween than depicted in FIG. 5, it being presented to illustrate the substantially continuous curvilinear domain walls of varyng wall separation and orientation.

Figure 6:
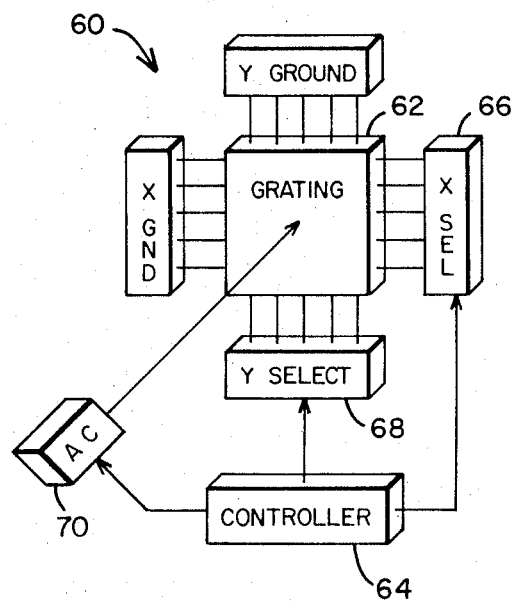
FIG. 6 is a diagrammatic illustration of a block diagram of a programmable diffraction grating system incoporating the present invention.
Figure 7A:
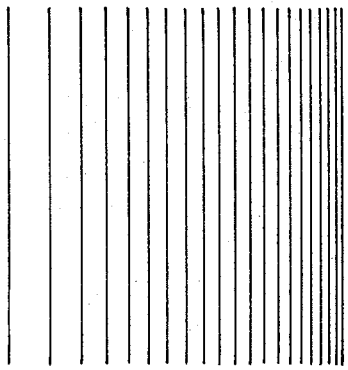
FIG. 7a - 7f are illustrations of various grating conformations that may be achieved by the grating of the present invention.
Figure 7B:
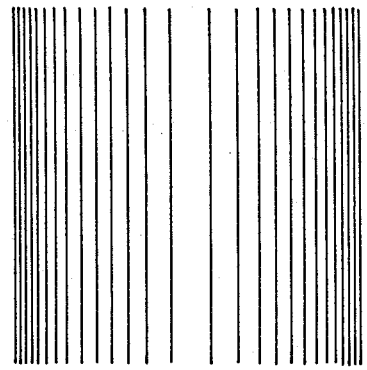
Figure 7C:
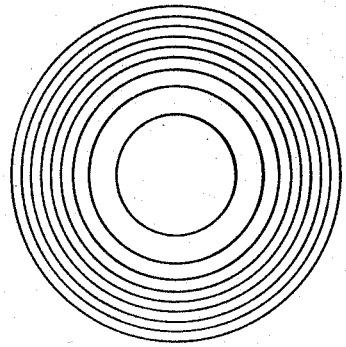
Figure 7D:
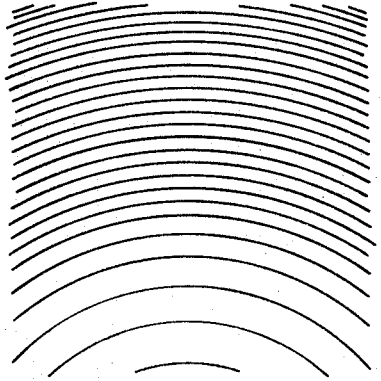
Figure 7E:
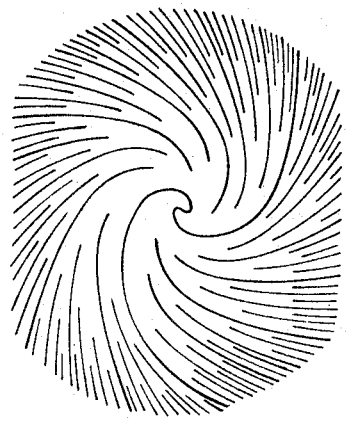
Figure 7F:
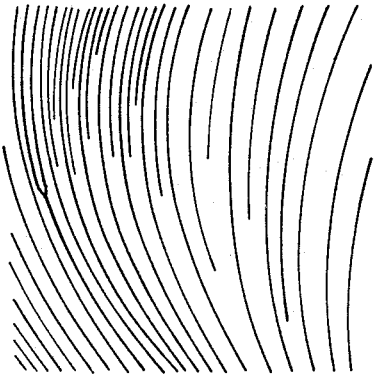

With particular reference to FIG. 6 there is presented a schematic block diagram of a programmable diffraction grating system 60 for causing the stripe-domain film layer of grating 62 to have formed therein a fixed configuration of domain walls having different wall separation and orientation along their length. Controller 64 controls X select 66 and Y select 68 and AC source 70, in a manner as discussed in more detail with particular reference to FIGS. 2 and 3, to selectively couple the fixed X and Y selection currents $\pm I_X$ and $\pm I_Y$ of selected constant magnitude and polarity to each of the optical cells formed in an XY array in grating 62. Such system selectively determines the particular orientation, magnitude and polarity of each resultant DC magnetic field $H_R$ in the plane of each of the film elements 26 of each of the corresponding optical cells 20 for establishing in the planar stripe-domain film formed by the XY array of films of the optical cells a fixed configuration of domain walls of any desirable conformation. The system of FIG. 6 may be implemented in a volatile configuration in which the selection currents to all optical cells are applied simultaneously, or, alternatively, in nonvolatile configuration in which a film of substantial coercivity is used and in which the selection currents are applied successively to each optical cell.

As discussed in the aforementioned E. J. Torok, et al., patent application, the magnetizable film layer 18 of, e.g., YIG crystal has its magnetization arranged in a plurality of stripe-domains. Film 18 may be of either the Faraday or Kerr effect variety but must have the necessary magnetic characteristics to have its magnetization capable of being arranged in a plurality of stripe-domain such as illustrated in more detail in FIG. 5. The adjacent stripe-domain are each separated by a domain wall, e.g., 43c and have their magnetizations aligned in opposite up-down orientation, at an angle to the plane surface of the film with their average magnetizations aligned in the plane of the film as illustrated by magnetization vectors 52 and 53. By applying a resultant DC field $H_R$ of the proper angular orientation and magnitude and a concurrent AC tickle field $H_T$, e.g., orthogonal to the domain walls of film, the stripe-domain wall orientation and separation may be selectively controlled. Thus, by applying a resultant DC field $H_R$ parallel, in the same direction as, the film's existing magnetic vector of a decreasing magnitude the wall separation is decreased, while with an increasing magnitude the wall separation is increased. Conversely, if the resultant DC field $H_R$ is antiparallel, in the opposite direction as, the film's existing magnetization vector of a decreasing magnitude the wall separation is increased, while with an increasing magnitude the wall separation is decreased, and as before, the orientation of the resultant DC field $H_R$ determines the orientation of the domain walls in the plane of the film. Using these relationships, this system of FIG. 6 may be utilized to achieve many domain wall configurations in grating 62.

As discussed hereinabove, the grating of the present invention is intended to be utilized in an optical processing system. Thus, the various diffraction grating conformations, of various configurations of substantially continuous curvilinear domain walls of varying wall separation and orientation may be utilized to form real-time preprocessing of aerial photographs or radar pictures. With particular reference to FIGS. 7a – 7f there are illustrated some typical fixed grating conformations for performing specific optical processing tasks as noted with the associated figure.

What is claimed is:

1. A programmable diffraction grating, comprising:
   a planar matrix array of X directional magnetic field generating elements;
   a planar matrix array of Y directional magnetic field generating Y elements;
   pairs of interacting ones of each of said X and Y elements arranged in an interacting X and Y directioned magnetic field configuration;
   X current source selection means selectively coupled to each of said X elements for selectively coupling an X selection current of selectable polarity and amplitude to a selected one of said X elements;
   Y current source selection means separately coupled to each of said Y elements for selectively coupling a Y selection current of selectable polarity and amplitude to a selected one of said Y elements;

a plurality of coplanar stripe-domain film elements, a separate one inductively coupled to only a separate pair of said interacting X and Y elements for forming XY optical cells;

current control means concurrently controlling said X and Y current source selection means for concurrently coupling selected X and Y selection currents of selected polarities and amplitudes to a selected one of said pairs of said interacting X and Y elements for generating in the plane of the one inductively coupled stripe-domain film element a resultant DC magnetic field $H_R$ of a predetermined direction and magnitude;

AC field means inductively coupled to said XY optical cells and coacting with the associated resultant DC magnetic fields $H_R$ for generating a selected configuration of substantially continuously different dimensioned stripe-domain wall separations in said plurality of coplanar stripe-domain film elements.

2. The grating of claim 1 in which said AC magnetic field is directed substantially normal to the plane of said film elements.

3. The grating of claim 1 in which said film elements are individual portions of a continuous layer.

4. A programmable diffraction grating, comprising:
an array of optical cells, each optical cell including:
a planar stripe-domain film element;
orthogonal X and Y directioned-magnetic-field-generating X and Y elements inductively coupled to said film element;
means for inductively coupling an AC magnetic field to said array of optical cells;
selection means coupled to said X and Y elements for generating in the plane of each of said film elements a resultant DC magnetic field of a predetermined orientation and magnitude;

control means controlling said selection means for separately determining the particular orientation and magnitude of each of said resultant DC magnetic fields in the plane of each of said film elements;

a fixed configuration of stripe domains established in said film elements of said array of optical cells by said resultant DC magnetic fields in which interdomain walls are substantially continuous across two or more adjacent ones of said fillm elements, said interdomain walls having different dimensioned wall separations.

5. The grating of claim 4 in which said AC magnetic field is directed substantially normal to the planes of said film elements.

6. The grating of claim 4 in which said AC magnetic field is of a sufficient magnitude to overcome the hysteresis of said film elements during the initial application of said resultant DC magnetic fields.

7. The grating of claim 4 in which said AC magnetic fields are directed substantially normal to said interdomain walls.

8. The grating of claim 4 in which said film elements of said array of optical cells are individual portions of a continuous layer.

9. The grating of claim 4 in which said wall separations differ between adjacent interdomain walls and along adjacent interdomain walls.

10. The grating of claim 4 in which said fixed configuration of stripe domains is comprised of a series of interdomain walls forming concentric circles of successively decreasing dimensioned wall separations.

11. The grating of claim 4 in which said fixed configuration of stripe domains is comprised of a series of interdomain walls forming parallel straight lines of successively decreasing dimensioned wall separations.

* * * * *

UNITED STATES PATENT OFFICE
CERTIFICATE OF CORRECTION

Patent No. 3,861,784          Dated January 21, 1975

Inventor(s) ERNEST J. TOROK

It is certified that error appears in the above-identified patent and that said Letters Patent are hereby corrected as shown below:

IN THE PRINTED PATENT:

Claim 1, Column 4, line 55, after "generating" insert -- X --.

Signed and sealed this 15th day of April 1975.

(SEAL)
Attest:

RUTH C. MASON
Attesting Officer

C. MARSHALL DANN
Commissioner of Patents
and Trademarks